June 25, 1929.　　　R. H. KIPP　　　1,718,789
CULTIVATOR
Filed Aug. 6, 1926　　　2 Sheets-Sheet 2
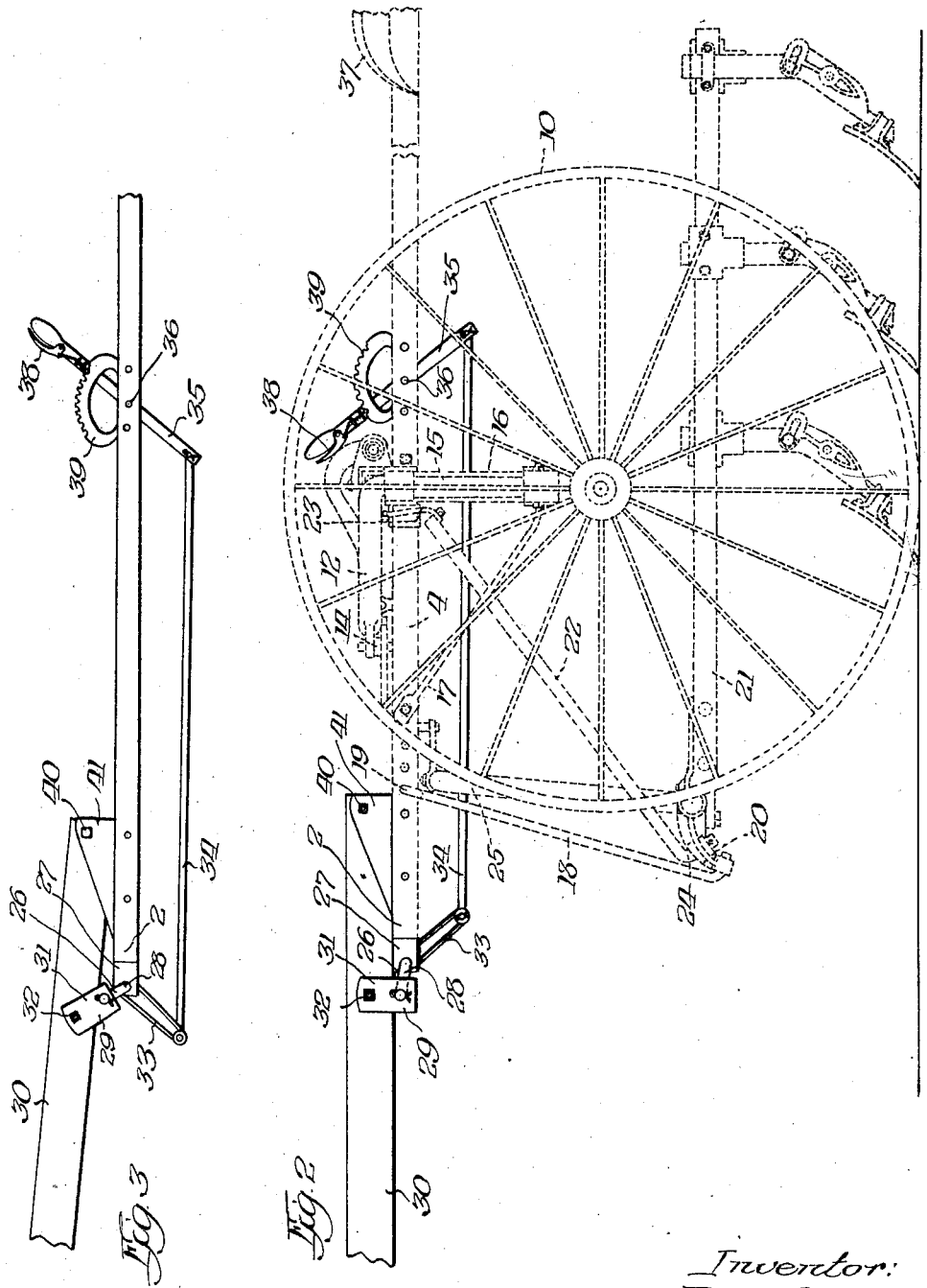

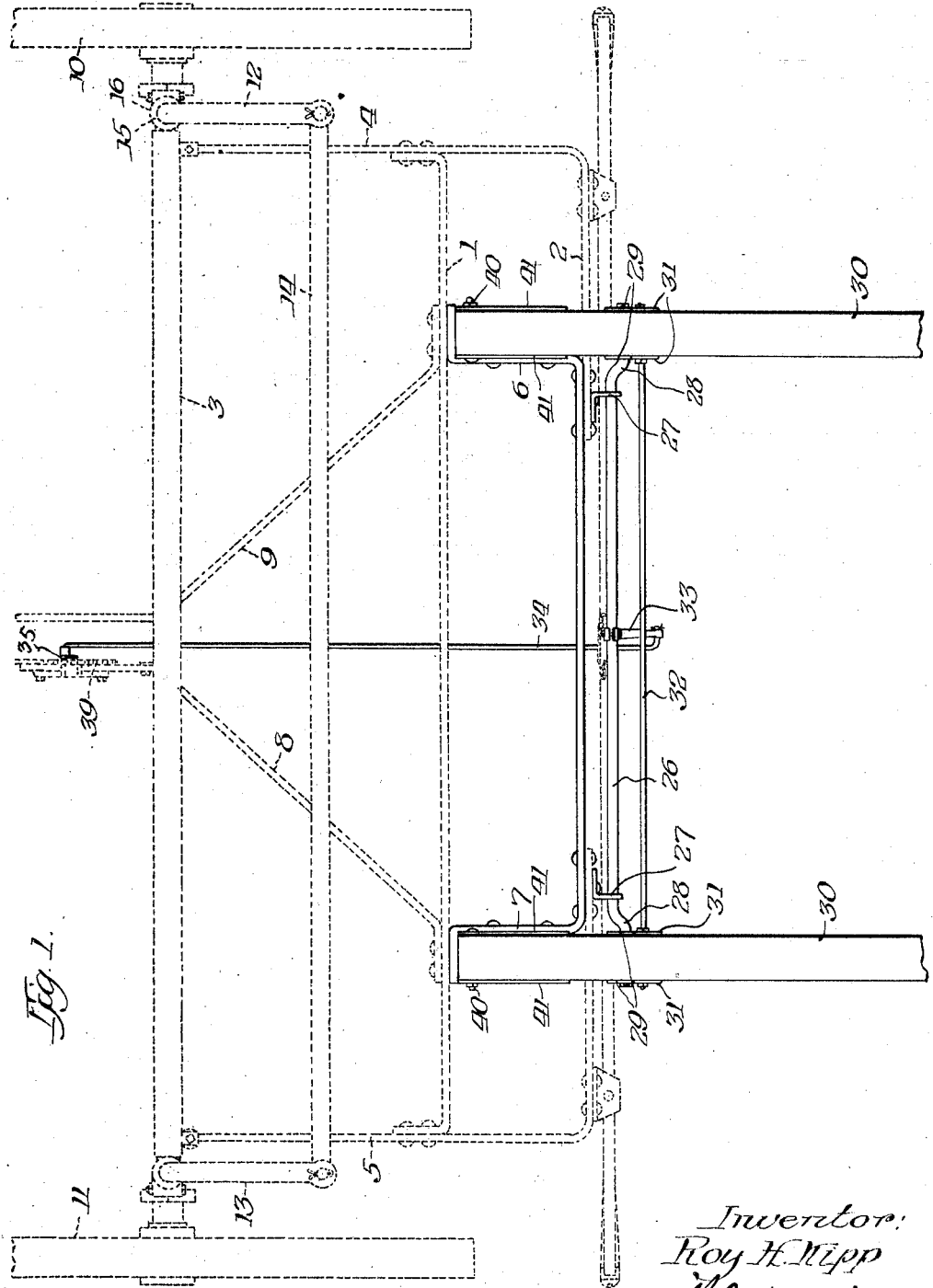

Patented June 25, 1929.

1,718,789

UNITED STATES PATENT OFFICE.

ROY H. KIPP, OF CHICAGO, ILLINOIS, ASSIGNOR TO INTERNATIONAL HARVESTER COMPANY, A CORPORATION OF NEW JERSEY.

CULTIVATOR.

Application filed August 6, 1926. Serial No. 127,508.

This invention relates to improvements in agricultural implements, and more particularly to an improved cultivator construction.

It is an object of the invention to provide a practical and novel implement frame construction which may be readily adjusted to meet the varying requirements of actual service.

It is a further object of the machine to provide a novel frame adjusting device for a two row cultivator.

It is a further object of the invention to provide a simplified and improved tongue adjusting device whereby the beams of a two row cultivator may be kept in normal operative position regardless of the different angles to which the tongue may be moved when different draft animals are attached to the cultivator.

Referring to the accompanying drawings in which an illustrative cultivator is shown,—

Figure 1 is a plan view of the improved implement construction;

Figure 2 is an elevation of the structure shown in Figure 1; and

Figure 3 is an elevation showing part of the mechanism illustrated in Figure 2, with the tongue shown in a different position of adjustment.

The illustrative cultivator includes a frame which is preferably rectangular, and composed of transverse bars 1, 2 and 3 connected by end bars 4 and 5. The transverse bars 1 and 2 are shown to be connected and braced by the bars 6 and 7, which are preferably spaced so as to advantageously maintain the tongues of the cultivator in operative position. The transverse bars 1 and 3 are braced by diagonal members 8 and 9 preferably converging rearwardly of the cultivator.

The illustrative machine is mounted upon ground wheels 10 and 11 the axles of which are so connected with the cultivator frame as to be rotatable about vertical axes. This construction constitutes what is known as a pivot axle construction. In the illustrative cultivator the wheels and their axles are turned to steer the implement by means of crank arms 12 and 13, which are shown to be rotatively mounted at the ends of the bar 3. The crank arms 12 and 13 are connected at their forward ends by the radius rod 14 which may be shifted transversely of the cultivator by means of any suitable steering device for maintaining the wheels 10 and 11 in parallelism and for shifting the wheels so as to dodge plants during the process of cultivation.

In Figure 2 of the drawings, the crank arm 12 is shown as having a vertically extending portion 15 journaled in a downwardly extending frame member 16. For the purpose of maintaining the elements 15 and 16 in the operative position shown in Figure 2, a diagonal brace 17 extends downwardly and rearwardly from the frame bar 4, to which it is fastened at its upper end. At its lower end the brace 17 is rigidly connected to the member 16.

The illustrative cultivator includes pendulum rods 18 pivotally connected to the frame at 19, and pivoted at their lower ends to a bracket 20 secured to a cultivator beam 21. In order that the cultivator beam 21 may be held in operative position and that the draft may be advantageously applied thereto, push rods 22 pivoted at their upper ends to brackets 23 secured to the frame, are provided. These push rods are formed with angularly extending lower ends 24 which are pivotally mounted in the brackets 20. It is to be understood that the beam construction indicated in Figure 2 of the drawings is shown for the purposes of illustration and that there are a plurality of such beam constructions provided for the cultivator. Adjacent beam constructions are preferably connected by upright yokes 25 pivoted at their lower ends in the brackets 20 and preferably supported so as to be transversely slidable at their upper ends with reference to the cultivator frame.

In the operation of such a cultivator as that shown in the drawings, it is desirable that the cultivator beams be maintained in substantial parallelism to the ground surface while the machine is in operation. The maintenance of such a condition depends to some extent upon the elevation to which the front end of the frame is placed when draft animals are hooked to the machine. Inasmuch as such animals vary considerably in height the forward end of the machine would be moved from its desired vertical position under various circumstances. To enable the forward end of the cultivator to be maintained in the desired position regardless of the elevation at which the forward end of the tongue is placed, means are illustrated for the purpose of adjusting the frame vertically relative to the tongue. The means here shown comprises a crank shaft 26 preferably rotatably supported on the cultivator frame by means of forwardly extending brackets 27. The illustrative crank shaft is formed with cranked portions 28 externally of the brackets 27. These cranked portions 28 are pivoted to links 29 preferably pivoted at their upper ends to the tongues 30, as indicated in Figure 2 of the drawings. In the structure shown, these links are in the form of U-shaped members having parallel portions, or legs 31, which straddle the tongues 30. The pivotal mounting for the legs 31 is provided by a rod 32 which extends through the tongues and braces them transversely by reason of the fact that it is a single element extending from one tongue to the other.

For the purpose of rotating the crank shaft 26 so as to obtain the desired adjustment of the cultivator frame relative to the tongue, the illustrative crank shaft is shown provided with a central crank arm 33. This crank arm preferably extends downwardly beneath the frame, as shown in Figure 2 of the drawings, and is pivotally connected at its lower end to a rearwardly extending link 34. The link 34 is connected at its other end to a lever 35 pivoted on the frame at 36 within convenient reach of the operator upon the seat 37. The lever 35 is provided with suitable detent mechanism 38 and a toothed rack 39 for holding the lever in any position to which it is adjusted.

In the drawings, the tongue 30 is shown as pivoted at 40, a point substantially rearwardly removed from the point at which the link 29 is connected to the tongue. For the purpose of so mounting the rearward end of the tongue, upstanding brackets 41 are rigidly secured to the frame members.

In Figure 2 of the drawings the rearward end of the tongue is shown in a position parallel to the frame of the cultivator, wherein it is in contact with the top of the front frame bar 2. In Figure 3 the tongue and the frame are shown adjusted so as to allow the front end of the tongue to be raised to a higher position and still maintain the cultivator beams in parallelism with the ground surface.

While the details of a particular construction are here shown and described for the purpose of illustrating the invention, it is to be understood that the invention is not limited to the exact details shown, but that it may be varied to meet the different requirements of service within the scope of the appended claims.

Having described my invention, I claim:

1. An improvement in agricultural implements comprising, in combination, a traveling frame, a tongue pivoted on the frame and extending forwardly therefrom, and adjusting connections between the tongue and the frame at a position a substantial distance forwardly of the point of pivotal connection between the rear end of the tongue and the frame, said adjustable connection comprising a crank, a U-shaped link embracing the tongue, and means for turning the crank to move the tongue and the frame relative to each other.

2. An improvement in cultivators comprising, in combination, a wheel supported frame, a tongue pivoted above the frame at a position considerably rearwardly of the front end of the frame and extending forwardly therefrom, and frame adjusting connections between the tongue and the frame at the front of the frame and at a position substantially removed from the point of pivotal connection between the tongue and the frame, said frame adjusting connections comprising a crank shaft rotatably supported by the cultivator frame, a link connecting the cranked portion of the crank shaft with the tongue, and means for rotatably adjusting the crank shaft for causing relative movement between the tongue and the frame.

3. An improvement in cultivators comprising, in combination, a wheel supported frame, a plurality of tongues extending forwardly of the frame and having their rearward ends pivotally mounted upon the frame at points substantially rearwardly removed from the forward end of the machine, a crank shaft rotatably mounted on the frame and extending between the tongues, cranks formed upon the ends of the crank shaft and located beneath the tongues, a U-shaped link pivotally secured at each end of the crank shaft and extending upwardly so as to embrace the tongue, means for pivotally mounting each link on the tongue, a central crank arm rigidly and centrally secured to the crank shaft, a lever pivotally secured to the frame within convenient reach of the operator for turning the crank shaft, and a link connecting the lever with the crank arm.

In testimony whereof I affix my signature.

ROY H. KIPP.